United States Patent [19]

Kaito

[11] Patent Number: 5,825,953
[45] Date of Patent: Oct. 20, 1998

[54] POLARIZED LIGHT VARIABLE LENS HOLDER

[75] Inventor: Yoshihiko Kaito, Sapporo, Japan

[73] Assignee: Fujitsu Limited, Kawasaki, Japan

[21] Appl. No.: 728,859

[22] Filed: Oct. 10, 1996

[30] Foreign Application Priority Data

Apr. 26, 1996 [JP] Japan ................................ 8-106578

[51] Int. Cl.[6] ........................................ G02B 6/36
[52] U.S. Cl. ............................................... 385/79
[58] Field of Search ............................ 385/39, 43, 78, 385/79, 132; 349/74, 42, 171, 122

[56] References Cited

U.S. PATENT DOCUMENTS 4,781,424  11/1988  Kawachi et al. .................. 385/13

*Primary Examiner*—Akm E. Ullah
*Attorney, Agent, or Firm*—Staas & Halsey

[57] ABSTRACT

A polarized light variable lens holder including a lens at one end, a ferrule including a polarization plane conserving fiber at another end, a $\lambda/2$ plate positioned between the lens and the ferrule. The holder includes a hole corresponding to the $\lambda/2$ plate position so that the $\lambda/2$ plate may be rotated in a direction perpendicular to an optical axis through the hole.

15 Claims, 9 Drawing Sheets

FIG. 12 ately, 5,825,953

POLARIZED LIGHT VARIABLE LENS HOLDER

BACKGROUND OF THE INVENTION

The present invention generally relates to a polarized light variable lens holder, and particularly, to a polarized light variable lens holder by which a polarization coupling between incident light and a ferrule having a certain polarization direction may be carried out easily by changing a polarization direction in the lens holder.

Many optical devices are required to have an input and an output of linear polarized light. The polarized light variable lens holder is used in order to couple an incident light and an outgoing light by conforming the direction of the former with that of the latter.

It is required for a polarized light variable lens holder that an adjustment of a direction of polarized light be easily performed.

Also, when a light coupling is performed between optical devices required to have an input and an output of linear polarized light, there is a demand to minimize insertion loss in addition to coupling light by conforming the polarized light in a predetermined direction.

In that case, there is a method to vary the polarization direction of a polarization plane conserving fiber in order to adjust a polarization direction. For instance, a method for conserving a predetermined polarization direction by adjusting a stress imparting portion of a panda fiber to a required polarization direction is conventionally carried out.

Figure 1:
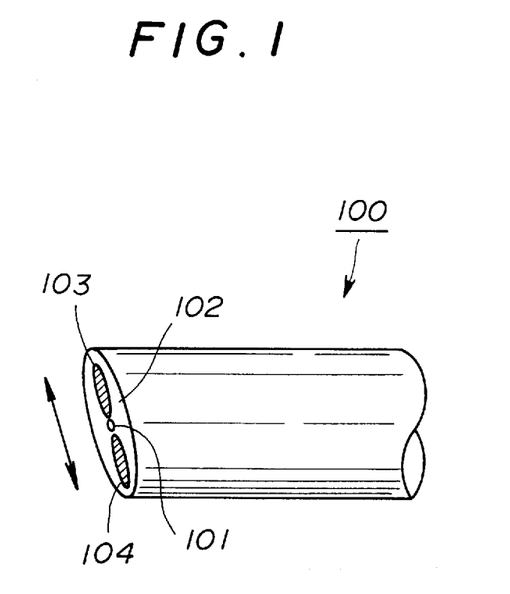
FIG. 1 is a diagram showing a clad portion of a panda fiber in a magnified scale.

FIG. 1 is a diagram showing a clad portion of a panda fiber in a magnified scale. In FIG. 1, the panda fiber 100 includes a core 101, cladding 102 and two stress imparting portions 103 and 104, which are located symmetrically relative to the core 101, made of different glass materials from that of the cladding 102. By this configuration, it is possible to give a polarization plane conservability, which transmits a linear polarized light in a direction of the stress imparting portions 103 and 104 as indicated by an arrow in the figure, by giving stress to the core 101.

Also, in order to minimize the insertion loss of a device, generally a coupling position or gate angle of the panda fiber to the device is adjusted.

Figure 2:
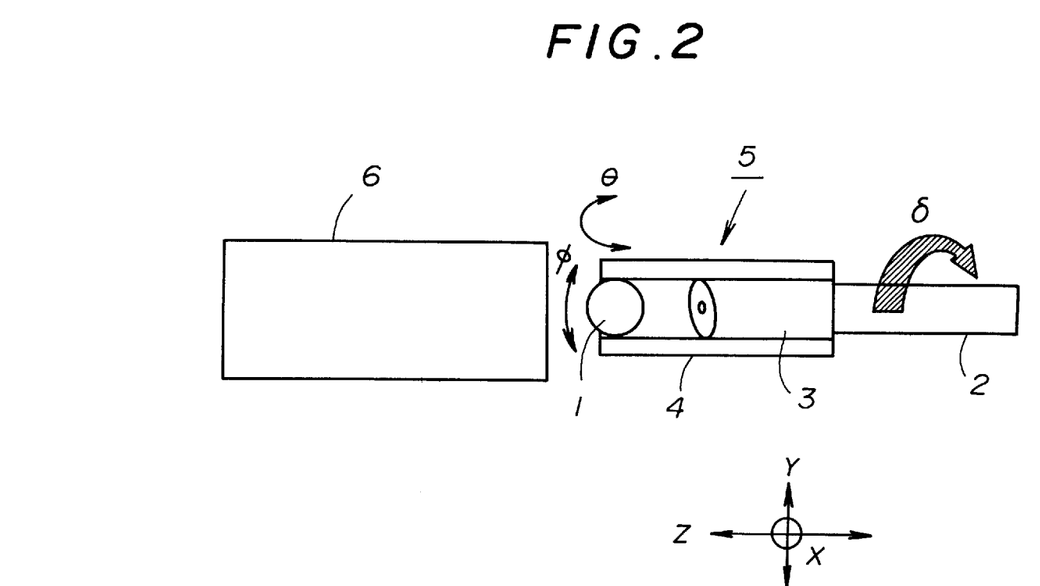
FIG. 2 is a diagram showing a coupling method of a conventional device to a panda fiber.

FIG. 2 is a diagram showing a coupling method of a conventional device to a panda fiber. As shown in FIG. 2, an insertion loss of a fiber lens assembly 5 to a device 6 may be minimized by adjusting the position in X, Y and Z directions of the fiber assembly 5 including a ferrule 3 having a lens 1 and a panda fiber 2, which is accommodated in a lens holder 4, relative to the device 6, and gate angles Θ in the X direction and φ in the Y direction, respectively.

However, if X, Y, Z, Θ and φ shown in FIG. 2 are adjusted in order to minimize the insertion loss of the device 6, linear polarized light is not conserved between the device 6 and the panda fiber 2 since the polarization direction δ of the panda fiber 2 is not adjusted.

Therefore, it is necessary to rotate the fiber lens assembly 5 around its axis to adjust it to a necessary polarized light direction. In this way, it is possible to conform a polarization direction of an incident light with that of the panda fiber 2, i.e., a direction of the stress imparting portion.

By carrying out such an adjustment of a polarization direction, however, the X, Y, Z, Θ and φ shown in FIG. 2 are shifted and therefore it is necessary to adjust them again to obtain a minimum insertion loss.

In a conventional method, the above-mentioned procedure is repeated in order to obtain a state in which the insertion loss is minimum and the polarization coupling is optimal. Thus, there is a problem that a number of steps are required for the adjustment of an optical axis between the device 6 and the fiber lens assembly 5.

SUMMARY OF THE INVENTION

It is a general object of this invention to provide a polarized light variable lens holder in which the above-mentioned problems are eliminated.

A more specific object of the present invention is to provide a polarized light variable lens holder by which a polarization direction may be changed without rotating a fiber lens assembly.

Another object of the present invention is to provide a polarized light variable lens holder by which an adjustment of minimizing the insertion loss and an adjustment of the polarization direction may be carried out independently.

Yet another object of the present invention is to provide a polarized light variable lens holder by which a number of steps required for an adjustment of an optical axis between a device and a fiber lens assembly may be decreased.

The objects described above are achieved by a polarized light variable lens holder in which a lens is inserted at one end and a ferrule including a polarization plane conserving fiber is inserted at another end, wherein a λ/2 plate is inserted between the lens and the ferrule.

According to the above polarized light variable lens holder, since the λ/2 plate is inserted in the lens holder, it is possible to couple an incident linear polarized light to a polarization conserving direction of a panda fiber, without rotating the lens holder, by rotating the λ/2 plate after making an adjustment for minimizing an insertion loss.

The objects described above are also achieved by the polarized light variable lens holder wherein a hole is formed at a position of the polarized light variable lens holder which corresponds to the λ/2 plate so that the λ/2 plate may be rotated by a force applied through the hole in a direction perpendicular to an optical axis.

According to the above polarized light variable lens holder, since a hole is formed at a position of the polarized light variable lens holder which corresponds to the λ/2 plate, the λ/2 plate may be easily rotated in a direction perpendicular to an optical axis using a needle, a pair of tweezers and so on through the hole.

The objects described above are also achieved by the polarized light variable lens holder wherein a small hole is provided on a side surface of the λ/2 plate.

According to the above polarized light variable lens holder, since the small hole is provided on a side surface of the λ/2 plate, the λ/2 plate may be easily rotated in a direction perpendicular to an optical axis by sticking a needle, a pair of tweezers and so on into the small hole and moving it.

The objects described above are also achieved by the polarized light variable lens holder wherein a plurality of knurls is provided around a side surface of the λ/2 plate.

According to the above polarized light variable lens holder, since a plurality of knurls is provided around the side surface of the λ/2 plate, the λ/2 plate can easily be rotated by hooking a tip of a needle or a pair of tweezers to the knurled portion through the hole provided in the lens holder and moving the needle or tweezers. Also, since knurls are provided around the entire side surface of the λ/2 plate, there is an advantage in that a direction of the λ/2 plate does not need to be predetermined before inserting it in the lens holder.

The objects described above are also achieved by the polarized light variable lens holder wherein an inner diameter of a lens inserting side of the polarized light variable lens holder is made larger than a diameter of the λ/2 plate and an inner diameter of a ferrule inserting side of the polarized light variable lens holder is made smaller than a diameter of the λ/2 plate so that a step is formed between the lens inserting side and the ferrule inserting side of the polarized light variable lens holder.

According to the above polarized light variable lens holder, since the diameter of the λ/2 plate is smaller than the inner diameter of the lens inserting side portion of the lens holder, the λ/2 plate can easily be put inside the lens holder from the lens inserting side portion. Also, since the inner diameter of the ferrule inserting side portion of the lens holder is made smaller than the diameter of the λ/2 plate, the λ/2 plate is stopped at the boundary of the ferrule inserting side portion and the lens inserting side portion so that the position of the λ/2 plate may be fixed.

The objects described above are also achieved by the polarized light variable lens holder wherein an inner diameter of a lens inserting side of the polarized light variable lens holder is made smaller than a diameter of the λ/2 plate and an inner diameter of a ferrule inserting side of the polarized light variable lens holder is made larger than a diameter of the λ/2 plate so that a step is formed between the lens inserting side and the ferrule inserting side of the polarized light variable lens holder.

According to the above polarized light variable lens holder, since the inner diameter of the ferrule inserting side portion of the lens holder is bigger than the diameter of the λ/2 plate, the λ/2 plate may be easily inserted in the lens holder from the ferrule inserting side portion. Also, since the inner diameter of the lens inserting side portion of the lens holder is made smaller than the diameter of the λ/2 plate, the λ/2 plate is stopped at the boundary of the lens inserting side portion and the ferrule inserting side portion so that the position of the λ/2 plate may be defined.

The objects described above are also achieved by the polarized light variable lens holder wherein a hole having a width larger than a width of the λ/2 plate is formed in the polarized light variable lens holder in a position corresponding to a position of the λ/2 plate so that the λ/2 plate may be inserted through the hole.

According to the above polarized light variable lens holder, since the λ/2 plate may be inserted in the lens holder from the side surface of the lens holder through the hole, the inserting operation of the λ/2 plate in the lens holder is eased compared with the cases in which the λ/2 plate is inserted from the lens inserting side or the ferrule inserting side.

The objects described above are also achieved by the polarized light variable lens holder wherein the λ/2 plate is fixed to the polarized light variable lens holder by an adhesive put through the hole formed in the polarized light variable lens holder after an adjustment of the λ/2 plate.

According to the above polarized light variable lens holder, it is possible to fix the λ/2 plate in the polarized light variable lens holder so that the adjustment state of the polarization direction is not varied by applying an adhesive composition to the hole provided in the side surface of the lens holder after making an adjustment of the polarization direction by rotating the λ/2 plate inserted in the lens holder so as to conserve the linear polarization.

The objects described above are also achieved by the polarized light variable lens holder wherein the λ/2 plate is fixed to the polarized light variable lens holder by solder put through the hole formed in the polarized light variable lens holder after an adjustment of the λ/2 plate.

According to the above polarized light variable lens holder, it is possible to fix the λ/2 plate in the lens holder so that the adjustment state of the polarization direction is not varied by applying the solder to the hole provided in the side surface of the lens holder after making an adjustment of the polarization direction by rotating the λ/2 plate inserted in the lens holder so as to conserve the linear polarization.

The objects described above are also achieved by the polarized light variable lens holder wherein a side surface of the λ/2 plate is coated with a metal having a solder adherence property.

According to the above polarized light variable lens holder, since the side surface of the λ/2 plate is coated with a metal having a solder adherence property, a soldering state may be secured.

The objects described above are also achieved by the polarized light variable lens holder wherein a λ/4 plate, instead of the λ/2 plate, is inserted in the polarized light variable lens holder.

According to the above polarized light variable lens holder, since the magnitude of a polarization component in a direction vertical to a polarization direction of a linear polarized light injected through the lens may be varied by rotating the λ/4 plate in a direction perpendicular to the optical axis, it is possible to gradually change it from a curved polarized light to a linear polarized light by varying the magnitude of the vertical polarization component even in the case that the incident light is a curved polarized light.

The objects described above are also achieved by the polarized light variable lens holder wherein a λ/4 plate, together with the λ/2 plate, is inserted in the polarized light variable lens holder.

According to the above polarized light variable lens holder, it is possible to rotate the polarization direction of an incident light arbitrarily using the λ/2 plate and it is also possible to correct an output light from the λ/2 plate including curved polarized light to linear polarized light using the λ/4 plate.

Other objects and further features of the present invention will be apparent from the following detailed description when read in conjunction with the accompanied drawings.

DESCRIPTION OF THE PREFERRED EMBODIMENTS

In the following, a principle and embodiments of the present invention will be described with reference to the accompanying drawings.

Figure 3:
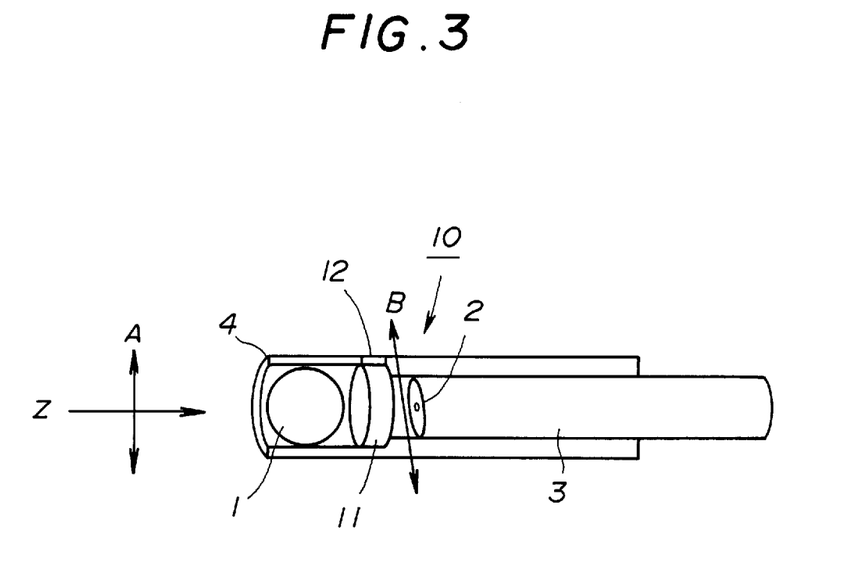
FIG. 3 is a diagram showing a first embodiment according to the present invention.

FIG. 3 is a diagram showing a first embodiment of a polarized light variable lens holder according to the present invention. In FIG. 3, the same reference numerals are used for the same elements shown in FIG. 2. As shown in FIG. 3, according to the present invention, the polarized light variable lens holder 10 having the following fiber lens structure is used instead of a conventional fiber lens assembly.

First of all, the lens holder 4 is of a cylindrical shape and includes the spherical lens 1 inserted in one end and the ferrule 3 of a pillar shape, which is inserted in the other end, having the panda fiber 2 as a polarization plane conserving fiber. The inner periphery of the lens holder 4 is fixed to the outer periphery of the ferrule 3. A $\lambda/2$ plate 11 is inserted in the lens holder 4 perpendicular to the optical axis so as to be located in between the lens 1 and the ferrule 3.

A hole 12 which may be a fatigue notch perpendicular to the axis is provided at a side surface of the lens holder 4. Thus, the $\lambda/2$ plate 11 can be rotated in a direction perpendicular to the optical axis using a needle or a pair of tweezers through the hole 12.

In this configuration, incident linear polarized light having a polarization in an A direction, traveling in a Z direction and going into the polarized light variable lens holder 10 through the lens 4, may be conformed with the polarization direction B of the panda fiber 2, which is the direction of the stress imparting portion, by rotating the $\lambda/2$ plate 11 appropriately. The linear polarized light goes into an end surface of the ferrule 3 maintaining the conformation state. Thus, it is possible to couple the panda fiber 2 with the linear polarized light so as to maintain the polarization of the light. At this time, the polarization direction of the incident light may be varied within a range of 90° by rotating the $\lambda/2$ plate 11 ±45° around the optical axis.

That is, by using the above-mentioned configuration, it is possible to couple an incident linear polarized light to a polarized light conserving direction of the panda fiber 2 by rotating only the $\lambda/2$ plate 11, i.e., without rotating the lens holder 4, after adjusting the insertion loss of the device.

Moreover, it is possible to correct the linear polarized light, which is polarized in an arbitrary direction, to become a linear polarized light having a desirable polarized light direction by inserting a $\lambda/4$ plate in the polarized light variable lens holder 10 (to be described later).

Figure 4:
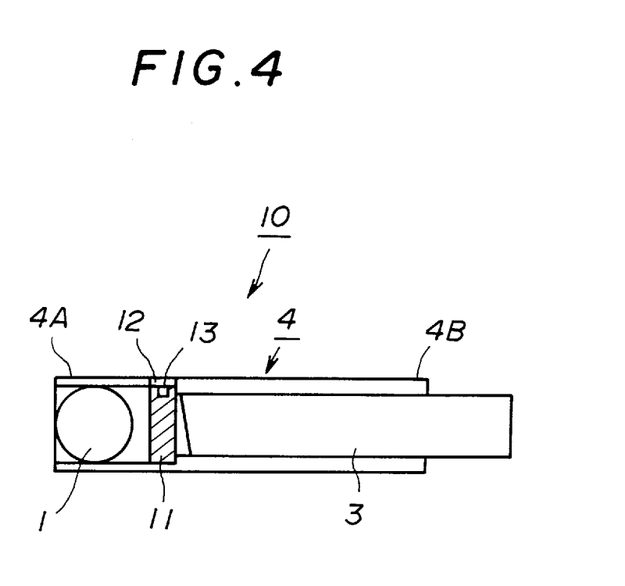
FIG. 4 is a diagram showing second and fourth embodiments according to the present invention.

FIG. 4 is a diagram showing a second embodiment according to the present invention. In FIG. 4, the same reference numerals are used for the same elements shown in FIG. 3. The reference numeral 13 indicates a small hole provided on a side surface of the $\lambda/2$ plate 11.

As shown in FIG. 4, the $\lambda/2$ plate 11 can easily be rotated by sticking a tip of a needle or a pair of tweezers into the small hole 13 through the hole 12 provided in the lens holder 4 and moving the needle or tweezers. The small hole 13 can be formed in a plurality of positions.

Figure 5:
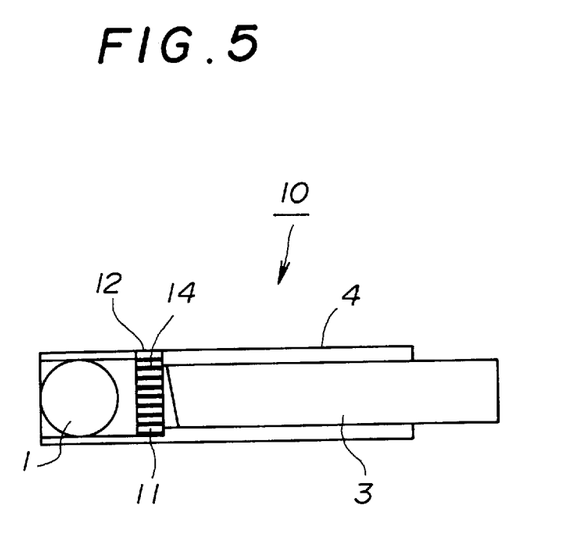
FIG. 5 is a diagram showing a third embodiment according to the present invention.

FIG. 5 is a diagram showing a third embodiment according to the present invention. In FIG. 5, the same reference numerals are used for the same elements shown in FIG. 3. The numeral 14 indicates a knurled portion provided on a side surface of the $\lambda/2$ plate 11. The knurled portion 14 may be formed by a plurality of small concavo-convex units parallel to the optical axis.

As shown in FIG. 5, the $\lambda/2$ plate 11 can easily be rotated by hooking a tip of a needle or a pair of tweezers to the knurled portion 14 through the hole 12 provided in the lens holder 4 and moving the needle or tweezers.

In FIG. 5, since knurls are provided around the entire side surface of the $\lambda/2$ plate 11, there is an advantage in that a direction of the $\lambda/2$ plate 11 does not need to be predetermined before inserting it in the lens holder 4.

According to a fourth embodiment of the present invention, the diameter of the $\lambda/2$ plate 11 is smaller than the inner diameter of a lens inserting side portion 4A of the lens holder 4 as shown in FIG. 4. Thus, the $\lambda/2$ plate 11 can easily be put inside the lens holder 4 from the lens inserting side portion 4A. In that case, the lens 1 is inserted in the lens holder 4 after the insertion of the $\lambda/2$ plate 11.

The inner diameter of the ferrule inserting side portion 4B of the lens holder 4, on the other hand, is made smaller than the diameter of the $\lambda/2$ plate 11 and about the same size as the ferrule 3. Thus, the $\lambda/2$ plate 11 is stopped at the boundary of the ferrule inserting side portion 4B so that its position may be determined.

Figure 6:
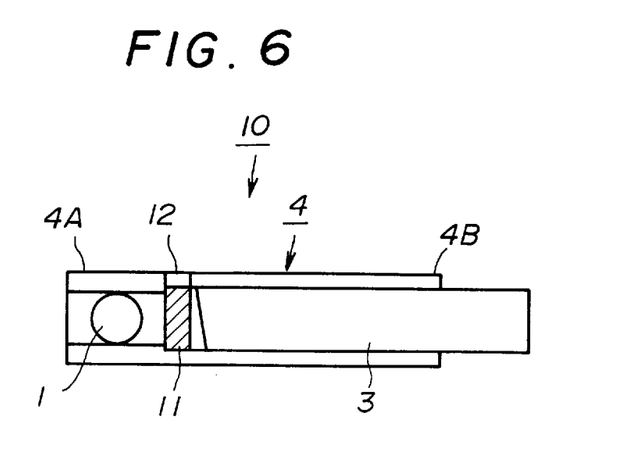
FIG. 6 is a diagram showing a fifth embodiment according to the present invention.

FIG. 6 is a diagram showing a fifth embodiment according to the present invention. In FIG. 6, the same reference numerals are used for the same elements shown in FIG. 3. In this case, the inner diameter of the ferrule inserting side portion 4B of the lens holder 4 is bigger than the diameter of the $\lambda/2$ plate 11. Therefore, the $\lambda/2$ plate 11 may be easily inserted in the lens holder 4 from the ferrule inserting side portion 4B. In this case, the ferrule 3 is inserted in the lens holder 4 after the insertion of the $\lambda/2$ plate.

The inner diameter of the lens inserting side portion 4A of the lens holder 4, on the other hand, is made smaller than the diameter of the $\lambda/2$ plate 11. Thus, the $\lambda/2$ plate 11 is stopped at the boundary of the lens inserting side portion 4A so that its position may be determined.

Figure 7:
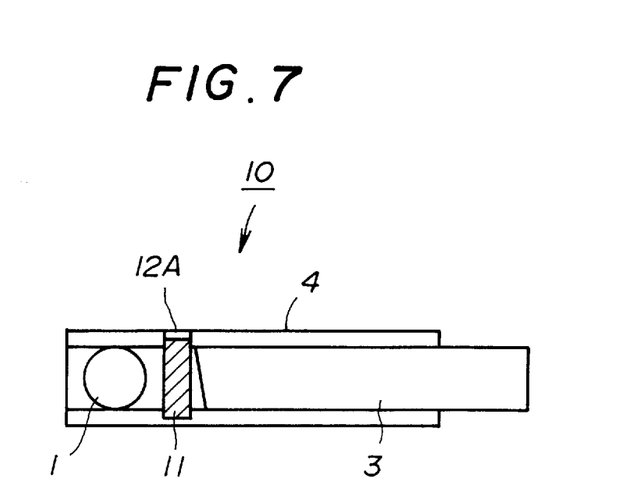
FIG. 7 is a diagram showing a sixth embodiment according to the present invention.

FIG. 7 is a diagram showing a sixth embodiment according to the present invention. In FIG. 7, the same reference numerals are used for the same elements shown in FIG. 3. In this case, the width of a hole 12A provided in a side surface of the lens holder 4 is bigger than the diameter of the $\lambda/2$ plate 11.

In this case, the $\lambda/2$ plate 11 may be inserted in the lens holder 4 from the side surface of the lens holder 4 through the hole 12A. In this case, the ferrule 3 is inserted in the lens holder 4 after the insertion of the $\lambda/2$ plate. Therefore, the inserting operation of the $\lambda/2$ plate 11 in the lens holder 4 is eased compared with the cases in which the $\lambda/2$ plate is inserted from the lens inserting side 4A or the ferrule inserting side 4B.

Figure 8:
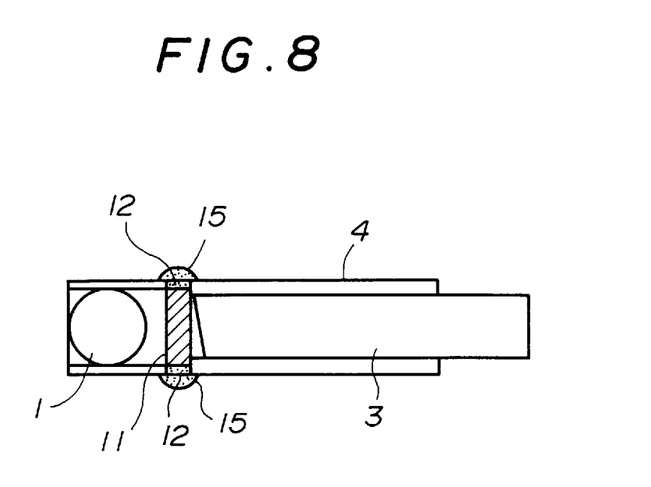
FIG. 8 is a diagram showing a seventh embodiment according to the present invention.

FIG. 8 is a diagram showing a seventh embodiment according to the present invention. In FIG. 8, the same reference numerals are used for the same elements shown in FIG. 3. In this case, the reference numeral 15 indicates an adhesive composition applied to the hole 12 provided in a side surface of the lens holder 4.

In this embodiment, it is possible to fix the $\lambda/2$ plate 11 in the lens holder 4 so that the adjustment state of the polarization direction is not varied by applying the adhesive composition 15 to the hole 12 provided in the side surface of the lens holder 4 after making an adjustment of the polarization direction by rotating the λ/2 plate 11 inserted in the lens holder 4 so as to conserve the linear polarization. In this case, it is preferable to provide a plurality of holes 12 in the side surface of the lens holder 4 so that the application of the adhesive composition 15 may be made through each of the holes 12 in order to secure the fixation of the λ/2 plate 11 to the lens holder 4.

Figure 9:
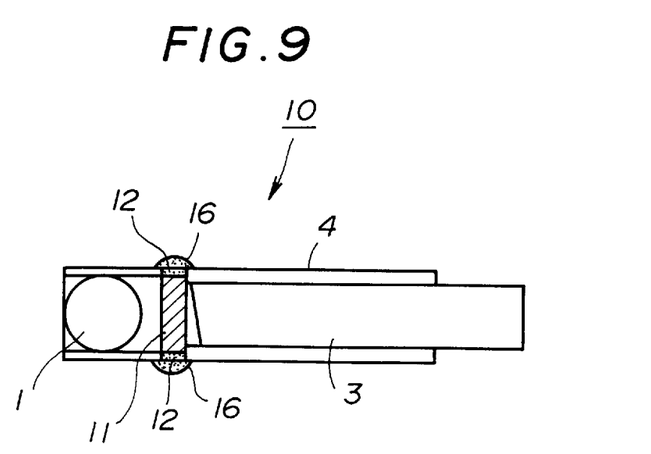
FIG. 9 is a diagram showing an eighth embodiment according to the present invention.

FIG. 9 is a diagram showing an eighth embodiment according to the present invention. In FIG. 9, the same reference numeral is used for the same element shown in FIG. 3. In this case, the reference numeral 16 indicates solder put into the hole 12 provided in the side surface of the lens holder 4.

In this embodiment, it is possible to fix the λ/2 plate 11 in the lens holder 4 so that the adjustment state of the polarization direction is not varied by applying the solder 16 to the hole 12 provided in the side surface of the lens holder 4 after making an adjustment of the polarization direction by rotating the λ/2 plate 11 inserted in the lens holder 4 so as to conserve the linear polarization. In this case, it is preferable to provide a plurality of holes 12 in the side surface of the lens holder 4 so that the application of the solder 16 may be made through each of the holes 12 in order to secure the fixation of the λ/2 plate 11 to the lens holder 4. Also, in this embodiment, it is preferable to precoat the side surface of the λ/2 plate 11 with a metal having an excellent solder adherence property to improve solderability. However, it is possible to fix the λ/2 plate 11 by a simple solidification of solder, even if the solder does not fuse with the (surface of the) λ/2 plate 11.

Figure 10:
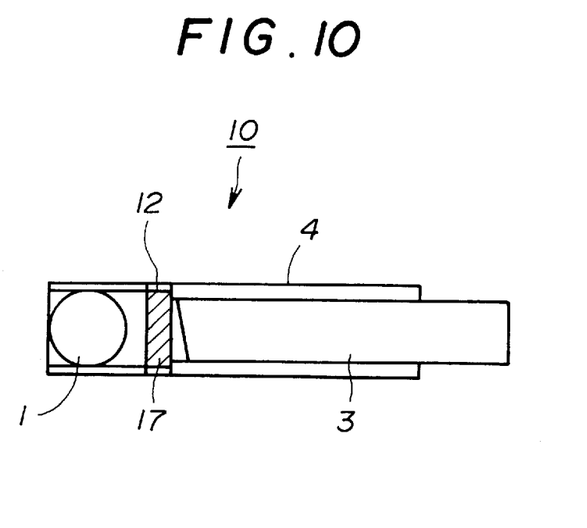
FIG. 10 is a diagram showing a ninth embodiment according to the present invention.

FIG. 10 is a diagram showing a ninth embodiment according to the present invention. In FIG. 10, the same reference numerals are used for the same elements shown in FIG. 3. In this embodiment, the reference numeral 17 indicates a λ/4 plate, which is made of such materials as rutile, having a thickness of λ/4 (λ indicates a wavelength used) in the optical axis direction.

The magnitude of a polarization component in a direction vertical to a polarization direction of a linear polarized light injected through the lens 1 may be varied by rotating the λ/4 plate 17 in a direction perpendicular to the optical axis. Thus, even in the case that the incident light is a curved polarized light, it is possible to gradually change it from a curved polarized light to a linear polarized light by varying the magnitude of the vertical polarization component. That is, by using the configuration shown in FIG. 10, it is possible to correct the incident light having curved polarization to a linear polarized light by eliminating vertical components, and couple it to the ferrule inserting side 4B of the lens holder 4.

In order to rotate the λ/4 plate 17, the methods described in the first to the third embodiments may be employed. Also, in order to insert the λ/4 plate 17 into the lens holder 4, the methods described in the fourth to sixth embodiments may be used. Moreover, in order to fix the λ/4 plate 17, the methods described in the seventh and eighth embodiments may be utilized.

Figure 11:
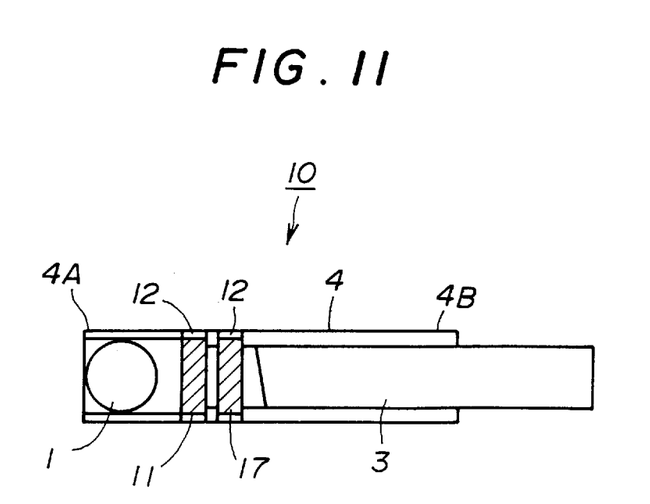
FIG. 11 is a diagram showing a tenth embodiment according to the present invention.

FIG. 11 is a diagram showing a tenth embodiment according to the present invention. In FIG. 11, the same reference numeral is used for the same element shown in FIGS. 3 and 10.

According to this embodiment, it is possible to rotate the polarization direction of an incident light arbitrarily using the λ/2 plate 11. Also, it is possible to correct an output light from the λ/2 plate 11 comprising curved polarized light to linear polarized light using the λ/4 plate 17.

Thus, according to the configuration shown in FIG. 11, it is possible to correct an incident light comprising curved polarized light of all polarization directions to a linear polarized light having a desired polarization direction, and couple it to the ferrule inserting side 4B of the lens holder 4.

Also, as a method to insert the λ/2 plate 11 and the λ/4 plate 17 into the lens holder 4, the diameter of the λ/2 plate 11 and the λ/4 plate 17, respectively, may be made smaller than the inner diameter of the lens inserting side 4A of the lens holder 4 so that the λ/2 plate 11 and the λ/4 plate 17 may be inserted into the lens holder 4 from the lens inserting side 4A. Moreover, it may be possible to form two holes, each having a width larger than that of the λ/2 plate 11 and the λ/4 plate 17, respectively, in the side surface of the lens holder 4 so that the λ/2 plate 11 and the λ/4 plate 17 may be inserted from the side surface of the lens holder 4 as explained in the sixth embodiment of the present invention.

There may be a space between the λ/2 plate 11 and the λ/4 plate 17, but not necessarily. When the space is provided, it is appropriate to insert a ring type spacer having a suitable thickness between the λ/2 plate 11 and the λ/4 plate 17.

Figure 12:
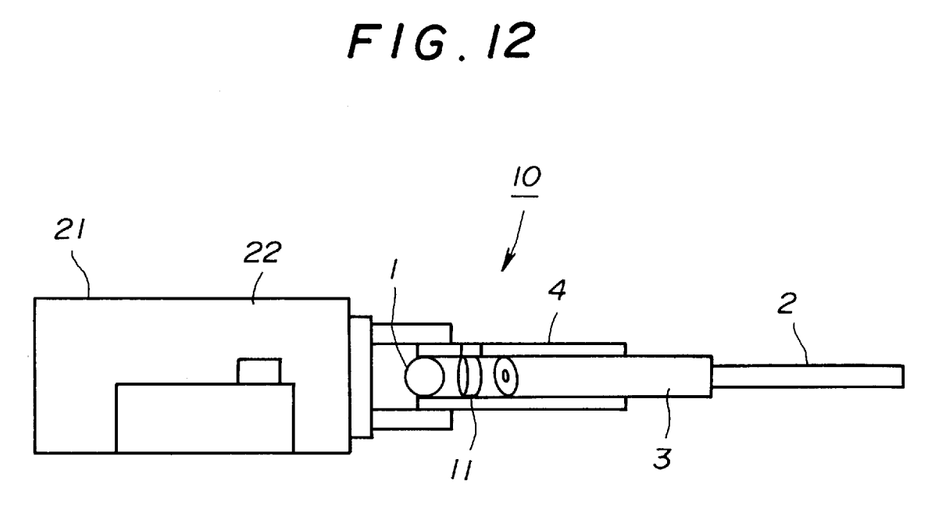
FIG. 12 is a diagram showing an application of an embodiment according to the present invention.

FIG. 12 is a diagram showing an application of an embodiment according to the present invention. In this embodiment, the polarized light variable Lens holder 10 is applied to a combination with an LD module 21.

In FIG. 12, the LD module 21 includes a LD element 22 which is driven by a driving circuit to output a laser beam including linear polarized light. The output light from the LD element 22 is injected into the polarized light variable lens holder 10 through the lens 1. Then the polarization direction of the light is corrected by the λ/2 plate 11 and the light injected to an end surface of the ferrule 3. At this time, the polarization direction of the incident light is conformed with the direction of the stress imparting portion of the panda fiber 2 in the ferrule 3 so that the polarization of the light beam is correctly coupled with the panda fiber 2.

The present invention is not limited to the above-mentioned embodiments, and variations and modifications may be made without departing from the scope of the present invention.

What is claimed is:

1. A polarized light variable lens holder having a first end and a second end, comprising:
   a lens at the first end;
   a ferrule including a polarization plane conserving fiber at the second end;
   a λ/2 plate between said lens and said ferrule; and
   a first hole formed at a position of said polarized light variable lens holder which corresponds to said λ/2 plate so that said λ/2 plate may be rotated in a direction perpendicular to an optical axis by a force applied through said hole.

2. The polarized light variable lens holder as claimed in claim 1, wherein a second hole is provided on a side surface of said λ/2 plate.

3. The polarized light variable lens holder as claimed in claim 1, wherein a plurality of knurls is provided on a side surface of said λ/2 plate.

4. The polarized light variable lens holder as claimed in claim 1, wherein an inner diameter of the first end is larger than a diameter of said λ/2 plate, and an inner diameter of said second end is smaller than a diameter of said λ/2 plate, so that a step is formed between said first and second ends.

5. The polarized light variable lens holder as claimed in claim 1, wherein an inner diameter of the first end is smaller than a diameter of said λ/2 plate, and an inner diameter of the second end is larger than a diameter of said λ/2 plate, so that a step is formed between said first and second ends.

6. The polarized light variable lens holder as claimed in claim 1, wherein said first hole has a width larger than a width of said λ/2 plate so that said λ/2 plate may be inserted through said first hole.

7. The polarized light variable lens holder as claimed in claim 1, wherein said λ/2 plate is fixed to said polarized light variable lens holder by an adhesive put through said first hole formed in said polarized light variable lens holder after an adjustment of said λ/2 plate.

8. The polarized light variable lens holder as claimed in claim 1, wherein said λ/2 plate is fixed to said polarized light variable lens holder by solder put through said first hole formed in said polarized light variable lens holder after an adjustment of said λ/2 plate.

9. The polarized light variable lens holder as claimed in claim 8, wherein a side surface of said λ/2 plate includes a metal having a solder adherence property.

10. The polarized light variable lens holder as claimed in claim 2, further comprising: a λ/4 plate inserted in said polarized light variable lens holder.

11. The polarized light variable lens holder as claimed in claim 1, wherein a plurality of knurls is provided on a side surface of said λ/4 plate.

12. A polarized light variable lens holder having a first end and a second end, comprising;
- a lens at the first end,
- a ferrule including a polarization plane conserving fiber at the second end;
- a λ/4 plate between said lens and said ferrule; and
- a first hole formed at a position of said polarized light variable lens holder which corresponds to said λ/4 plate so that said λ/4 plate may be rotated in a direction perpendicular to an optical axis by a force applied through said hole.

13. The polarized light variable lens holder as claim in claim 12, wherein a second hole is provided on a side surface of said λ/4 plate.

14. A polarized light variable lens holder in which a lens is inserted at one end and a ferrule including a polarization plane conserving fiber is inserted at another end, wherein a λ/2 plate is inserted between said lens and said ferrule,
- wherein a hole is formed in a position of said polarized light variable lens holder which corresponds to said λ/2 plate so that said λ/2 plate may be rotated by a force applied through said hole in a direction perpendicular to an optical axis, and
- wherein an inner diameter of a lens inserting side of said polarized light variable lens holder is made larger than a diameter of said λ/2 plate and an inner diameter of a ferrule inserting side of said polarized light variable lens holder is made smaller than a diameter of said λ/2 plate so that a step is formed between said lens inserting side and said ferrule inserting side of said polarized light variable lens holder.

15. A polarized light variable lens holder in which a lens is inserted at one end and a ferrule including a polarization plane conserving fiber is inserted at another end, wherein a λ/2 plate is inserted between said lens and said ferrule,
- wherein a hole is formed in a position of said polarized light variable lens holder which corresponds to said λ/2 plate so that said λ/2 plate may be rotated by a force applied through said hole in a direction perpendicular to an optical axis, and
- wherein an inner diameter of a lens inserting side of said polarized light variable lens holder is made smaller than a diameter of said λ/2 plate and an inner diameter of a ferrule inserting side of said polarized light variable lens holder is made larger than a diameter of said λ/2 plate so that a step is formed between said lens inserting side and said ferrule inserting side of said polarized light variable lens holder.

* * * * *

UNITED STATES PATENT AND TRADEMARK OFFICE
CERTIFICATE OF CORRECTION

PATENT NO.:   5,825,953
DATED      :   October 20, 1998
INVENTOR(S):   Yoshihiko KAITO It is certified that error appears in the above-identified patent and that said Letters Patent is hereby corrected as shown below:

Col. 9,   line 22, change "claim 2" to --claim 1--.

Signed and Sealed this

Twenty-third Day of March, 1999

Q. TODD DICKINSON

Attest:

Attesting Officer

Acting Commissioner of Patents and Trademarks